United States Patent
Burke et al.

(10) Patent No.: US 6,189,340 B1
(45) Date of Patent: Feb. 20, 2001

(54) PROCESS FOR FORMING A TITANIA-CONTAINING PREFORM SILICA GLASS BLANK

(75) Inventors: Gerald Eugene Burke, Painted Post; Carlton Maurice Truesdale, Corning, both of NY (US)

(73) Assignee: Corning Incorporated, Corning, NY (US)

( * ) Notice: Under 35 U.S.C. 154(b), the term of this patent shall be extended for 0 days.

(21) Appl. No.: 09/171,748

(22) PCT Filed: Jun. 9, 1997

(86) PCT No.: PCT/US97/09988

§ 371 Date: Oct. 21, 1998

§ 102(e) Date: Oct. 21, 1998

(87) PCT Pub. No.: WO98/00372

PCT Pub. Date: Jan. 8, 1998

Related U.S. Application Data (60) Provisional application No. 60/019,982, filed on Jun. 17, 1996.

(51) Int. Cl.[7] ............ C03C 13/02; C03C 13/04; G02B 6/16
(52) U.S. Cl. .................. 65/399; 65/386; 65/391; 65/421; 65/422; 65/423; 65/424; 65/427
(58) Field of Search .................. 65/386, 391, 399, 65/421, 422, 423, 424, 427

(56) References Cited

U.S. PATENT DOCUMENTS 5,067,975 * 11/1991 Backer et al. .
5,154,744 * 10/1992 Blackwell et al. .
5,841,933 * 11/1998 Hoaglin et al. .

* cited by examiner

*Primary Examiner*—Stanley S. Silverman
*Assistant Examiner*—Michael P. Colaianni
(74) *Attorney, Agent, or Firm*—William J. Chervenak (57) ABSTRACT

Disclosed is an optical waveguide fiber having a compressive outer layer that includes $TiO_2$ in the $SiO_2$ matrix glass. The compressive outer layer includes crystalline structures containing $TiO_2$ that are predominately rutile. Also disclosed is a method for making an optical waveguide fiber having a compressive outer layer. The compressive outer layer can contain an additional metal oxide that is preferentially lost from the outer layer, instead of the $TiO_2$, during the drying and consolidation step.

14 Claims, 3 Drawing Sheets

PROCESS FOR FORMING A TITANIA-CONTAINING PREFORM SILICA GLASS BLANK

This application is a 371 of PCT/US 97/09988 filed Jun. 9, 1997 which claims benefit under 35 U.S.C. § 119(e) of Provisional application 60/019,982 filed Jun. 17, 1996.

FIELD OF INVENTION

The present invention relates to optical waveguide fibers and, more particularly, to a process for forming titania-containing silica glass blanks and preforms useful for producing optical waveguide fibers.

BACKGROUND OF THE INVENTION

Although glass is a brittle material, the intrinsic strength of pristine glass optical fibers is very high, on the order of 1,000,000 psi for $SiO_2$ based fibers. Typically, glass optical fibers fail from surface imperfections when placed under sufficient tensile stress. Accordingly, much effort has been devoted to the elimination of surface flaws by careful handling during and after lass forming by a protective plastic coating, and by various treatments to the glass surface. In the latter case, one method of reducing failure by surface flaws is to provide a compressive stress on the glass surface that counteracts applied tensile stresses.

It is well known that flaws in glass grow subcritically prior to failure when subjected to tensile stress in the presence of water, ammonia, or other corrosive agents. This phenomenon of subcritical crack growth in glass is known as fatigue and greatly impacts the long-term reliability of glass-based materials such as glass optical fibers. Therefore, the fatigue performance of optical fiber is especially important to the design of low cost fiber cables which have fewer strength members and less environmental protection than standard optical telecommunications cables.

It has been known for some time that the strength of a glass body may be increased by forming its surface region from a glass with a thermal coefficient of expansion that is lower than the thermal coefficient of expansion of the interior glass. As the combination is cooled from high temperatures, this configuration places the glass surface in compression, thereby inhibiting the formation and growth of cracks. See, for example, U.S. Pat. No. 3,673,049 to Griffen et al. and Krohn and Cooper, "Strengthening of Glass Fibers: I, Cladding," *Journal of the American Ceramic Society*, 52(12):661–664 (1969).

Numerous attempts have been made to create a strengthened optical fiber with such a compressive surface layer. See, for example, U.S. Pat. No. 3,884,550 to Maurer et al. and MacChesney et al., "Low Loss Silica Core-Borosilicate Clad Fiber Optical Waveguide," *American Ceramic Society Bulletin*, 52:713 (1973). U.S. Pat. No. 4,181,403 to Macedo refers to compression in a thin surface layer formed by "molecular stuffing" in fiber with a large optical core and very thin optical cladding. Some of these attempts involved the use of a $TiO_2$—$SiO_2$ outer layer on the fiber, as its thermal coefficient of expansion is known to be less than that of $SiO_2$. See, for example, U.S. Pat. No 4,184,860 to Schneider et al., U.S. Pat. No. 4,243,298 to Kao et al., and Japanese Patent No. 1,255,795 to Taka et al.

U.S. Pat. No. 4,184,860 to Schneider et al. ("Schneider") describes an outer $TiO_2$—$SiO_2$ layer with 8 weight percent $TiO_2$ surrounding a 15 weight percent $TiO_2$ layer which is heat treated (by "tempering") to devitrify and partially separate and/or crystallize. This heat treatment of the 15 weight percent $TiO_2$ intermediate layer is intended to raise the thermal coefficient of expansion so that it is substantially greater than the coefficient of the outer $TiO_2$—$SiO_2$ layer, thereby putting the outer layer in compression. Thus, the Schneider fiber design relies on the 8 weight percent $TiO_2$ outer layer to provide enhanced strength through compression.

Another study involved $SiO_2$—$TiO_2$ glasses containing 10–20 weight percent $TiO_2$ that were clear when formed but exhibited increased opacity from phase separation and anatase formation, along with large changes in thermal expansion, upon heat treatment at temperatures below the annealing point. See "Binary Titania-Silica Glasses Containing 10 to 20 weight percent $TiO_2$," *Journal of the American Ceramic Society*, 58(5–6) (1976) and U.S. Pat. No. 3,690,855 to Schultz ("Schultz"). By studying the physical properties of these $TiO_2$—$SiO_2$ compositions, Schultz described three glass forming regions as stable (0–10 weight percent), metastable (10–18 weight percent) and unstable (>18 weight percent).

Some recent research has been directed toward understanding the mechanism of crack growth in $SiO_2$ glass on the molecular level. See, for example, Michalske and Bunker, "The Fracturing of Glass," *Scientific American*, December 1987, pp. 122–129. The Michalske and Bunker paper presents an atomistic study of glass fracture in the presence of water, but is limited to homogeneous $SiO_2$ glass. Additional research has been directed toward crack growth in continuous fiber filled composites. See, for example, Michalske and Hellmann, "Strength and Toughness of Continuous-Alumina Fiber-Reinforced Glass-Matrix Composites," *Journal of the American Ceramic Society*, 71(9):725–31 (1988).

Thus, it is known in the art that the addition of a $TiO_2$—$SiO_2$ outer cladding layer to an optical waveguide fiber produces beneficial results. A primary focus of this prior work has been increasing the fatigue resistance of the resulting optical waveguide fiber. Much of this work has concentrated on the use of $TiO_2$—$SiO_2$ outer cladding layers of relatively high thickness, with the minimum thickness of said layers being about 1 $\mu$m. For example, U.S. Pat. No. 4.243,298 to Kao et at. discloses the use of 1–10 $\mu$m thick $TiO_2$—$SiO_2$ layers, with a preferred range of 1–5 $\mu$m. U.S. Pat. No. 4,877,306 to Kar discloses $TiO_2$—$SiO_2$ outer cladding layers about 2–3 $\mu$m thick. Others have identified the range of 2–5 $\mu$m. See, for example, U.S. Pat. No. 4,975,102 to Edahiro et al. and Oh et al., "increased Durability of Optical Fiber Through the Use of Compressive Cladding," *Optics Letters* 7(5):241–43 (1982).

U.S. Pat. No. 5,067,975 to Backer et al. ("Backer et al. '975") expressly discloses the use of $TiO_2$—$SiO_2$ outer cladding layers in the range of about 1–3 $\mu$m in thickness. Additionally, U.S. Pat. No. 5,140,665 to Backer et al. ("Backer et al. '665") claims an optical waveguide fiber with a $TiO_2$—$SiO_2$ outer cladding layer, including an outermost cladding layer with thicknesses of less than 3 $\mu$m, and further claims outermost cladding layer thicknesses of less than 1 $\mu$m. U.S. Pat. No. 5,180,411 to Backer et al. ("Backer et al. '411"), a continuation-in-part of Backer et al. '975, discloses a method for manufacturing a fatigue resistant optical waveguide fiber with a $TiO_2$—$SiO_2$ outer cladding layer, whereby a layer of $TiO_2$—$SiO_2$ is deposited on, a doped $SiO_2$ preform and the resulting preform is exposed to an atmosphere containing, chlorine and oxygen at a temperature of about 900° to 1400° C. After consolidation, the blank is drawn into an optical waveguide fiber with inhomogeneities in its outer $TiO_2$—$SiO_2$ layer.

U.S. Pat. Nos. 5,241,615 and 5,318,613 to Amos et al. ("Amos et al. '615" and "Amos et al. '613") disclose an optical waveguide fiber with a very thin titania-silica outer cladding layer and a method for making it. The outer cladding layer of $TiO_2$—$SiO_2$ glass has a thickness of less than 1 µm and a $TiO_2$ concentration that is less than or equal to about 10 weight percent.

The present invention is directed to an improvement upon the manufacture of optical waveguide fibers with a $TiO_2$—$SiO_2$ glass outer cladding layer.

SUMMARY OF THE INVENTION

The present invention relates to a process for forming a preform comprising a core portion and a cladding portion surrounding the core portion. The preform is suitable for consolidation to a glass blank. In this process, Si and Ti containing compounds are oxidized to form $SiO_2$ and $TiO_2$. A preform containing the $SiO_2$ and $TiO_2$ is then formed where a portion of the $TiO_2$ present in the preform is in crystalline form with the crystalline form being predominantly rutile.

The present invention is further directed to a process for forming a preform comprising a core portion and a cladding portion surrounding the core portion. The preform is suitable for consolidation to a glass blank. This is achieved by oxidizing Si and Ti containing compounds and a precursor of all additive compound to form $SiO_2$, $TiO_2$ and the additive compound. A preform containing $SiO_2$, $TiO_2$, and the additive compound is formed where the additive compound is preferentially sacrificed instead of $TiO_2$ when the preform is consolidated.

Also in accordance with the present invention is a process for reducing the depletion of $TiO_2$ from an $SiO_2$—$TiO_2$ containing glass blank. This involves oxidizing Si and Ti containing compounds and a precursor of an additive compound to form $SiO_2$, $TiO_2$, and the additive compound. A preform containing $SiO_2$, $TiO_2$, and an additive compound is then formed. The preform is then consolidated under conditions effective to form a glass blank. The additive compound in the preform is effective to reduce the depletion of $TiO_2$ from the outer layer during consolidation.

Another aspect of the present invention relates to a process of drying a glass blank having a core portion and a cladding layer surrounding the core portion. The blank contains tin oxide and is dried in the absence of chlorine gas.

DETAILED DESCRIPTION OF THE INVENTION

The present invention is directed to forming a preform, which comprises a core portion and an inner cladding layer surrounding the core portion. The preform contains $SiO_2$ and $TiO_2$ where a portion of the $TiO_2$ in the preform is in a crystalline form that is predominantly rutile. The preform further comprises an additive compound that is preferentially sacrificed instead of $TiO_2$ when the preform is consolidated. The presence of the additive compound in the preform causes more of the crystalline $TiO_2$ present in the layer to be rutile than if the additive compound were not present. The rutile form preferably comprises at least 51 percent of the total crystalline $TiO_2$ in the outer cladding layer. This layer has a thickness of about 0.5 µm to 10 µm, preferably about 1 µm to 2 µm.

$TiO_2$ and the additive compound can be present in any portion of the preform, permitting the replacement of $GeO_2$ in the preform with $TiO_2$. However, it is particularly desirable to apply these materials together with $SiO_2$ to a porous outer cladding layer surrounding the inner cladding. As a result, the portion of $TiO_2$ in the outer cladding layer is in a crystalline form that is predominantly nitile. In addition, the additive compound present in the outer cladding layer is preferentially sacrificed instead of $TiO_2$ from the outer cladding layer during consolidation.

The additive compound in the outer cladding layer is a metal oxide compound, the metal being selected from the group consisting of Sn, Pb, Bi, Sb, and mixtures thereof. A preferred metal oxide compound is $SnO_2$, which preferably comprises about 0.1 to 10 weight percent, more preferably about 1 to 2 weight percent, of the outer cladding layer of the augmented preform.

A glass blank suitable for producing an optical waveguide fiber and comprising a core portion, a consolidated inner cladding layer surrounding the core portion, and a consolidated outer cladding layer surrounding the inner cladding layer can be produced by consolidating the preform. This is achieved by consolidating the preform under conditions effective to produce a glass blank. Consolidation is carried out at a temperature of 900° to 1400° C. in an atmosphere comprising a treating gas. The treating gas comprises a gas selected from the group consisting of helium oxygen, chlorine, and mixtures thereof. The process further comprises drawing the glass blank into an optical waveguide fiber.

In accordance with the process of the invention, the concentration of $TiO_2$ in the consolidated outer cladding layer of the glass blank is no more than about 3 weight percent less than the $TiO_2$ concentration in the porous outer cladding layer deposited on the preform. Preferably, the porous outer cladding layer on the preform comprises about 8 to 20 weight percent $TiO_2$, and the consolidated outer cladding layer of the glass blank comprises about 5 to 17 weight percent $TiO_2$. More preferably, the porous outer cladding layer comprises about 11 to 13 weight percent $TiO_2$, and the consolidated outer cladding layer comprises about 8 to 10 weight percent $TiO_2$. The temperature during the consolidation of the preform to the glass blank is at least 1100° C.

It is instructive to consider $TiO_2$—$SiO_2$ compositions in four forms: 1) bulk glass in general; 2) low density soot preforms; 3) higher density glass blanks after dehydration/consolidation, and 4) optical fibers after drawing. For $TiO_2$—$SiO_2$ compositions in general, at $TiO_2$ concentrations below the eutectic (about 10.5 wt. % $TiO_2$), the $TiO_2$ appears to be both randomly dispersed in the $SiO_2$ matrix and present in clusters of 5- and 6-fold coordinated Ti ions (4-fold coordinated Ti ions are less likely to occur in clusters and are only clustered in combination with 5- or 6-fold coordinated Ti ions). As $TiO_2$ concentrations increase above the eutectic point, these clusters are nucleating sites for somewhat spherical phase separated regions or "inhomogeneities" which grow in size and may begin to devitrify as crystalline $TiO_2$.

In the region of maximum glass stability—below the eutectic point—these inhomogeneities have not been observed; i.e. there are no significant levels of clusters greater than about 10 Angstroms in diameter, the resolution limit for a conventional Scanning Transmission Electron Microscope (STEM) instrument.

It is also possible to detect phase separation (i.e., to distinguish an inhomogeneity from a cluster) when the inhomogeneity reaches a sufficient size that discontinuities appear in macroscopic physical properties such as thermal expansion coefficient, density, refractive index, volume of mixing, strain and anneal points as a function of concentration. Such discontinuities have been correlated classically to a transition from an amorphous to a phase separated state.

In Backer et al. '975, it is disclosed that, after drawing at temperatures above 1900° C., optical fiber $TiO_2$—$SiO_2$ layers are amorphous glass at $TiO_2$ concentrations below about 11 weight percent. However, the Ti ions are believed not to be randomly dispersed in the $SO_2$ matrix but clustered with other Ti ions in 5- and 6-fold coordination, the same as in bulk glasses as described above. Valence bond theory suggests that it is unlikely that an isolated 5- or 6-fold coordinated Ti ion exists in the glass network; each such Ti ion would likely be linked to at least one other Ti ion, resulting in clustering. It should also be noted that the coordination of the Ti ions in optical fiber may be affected by the fast quench associated with the fiber drawing process and the presence of crystalline $TiO_2$ in the glass blank from which the fiber is drawn.

Clusters in compositions below about 11 weight percent $TiO_2$ are smaller than the critical size required for nucleation either as a separate liquid or crystalline phase in the draw process. Below this $TiO_2$ concentration, microscopic properties of the glass network control the mechanical performance of the resulting fibers, while above this level, "macroscopic" effects due to phase separation and crystallization determine the fibers' mechanical performance. In addition, dehydration/consolidation in $Cl_2$ increases the crystallization in the glass blank from which fibers are drawn, and such fibers appear to have a greater degree of phase separation.

For compositions below about 11 weight percent $TiO_2$, and in the homogeneous glass matrix for higher $TiO_2$ compositions, it is believed that the enhanced fatigue resistance of $TiO_2$—$SiO_2$ over $SiO_2$ may be explained by reference to bond force constants rather than bond energy, and by reference to the strong likelihood of clustered Ti ions in the glass.

Considering the bond energy alone, $TiO_2$—$SiO_2$ compositions would appear to be weaker than pure $SiO_2$, as the Ti—O bond strength as reported in the literature is on the order of 70 Kcal/mole, compared with 110 Kcal/mole for the Si—O bond. However, consideration of bond force constants leads to a very different result. In $TiO_2$—$SiO_2$ compositions, regardless of the Ti ion coordination, there are numerous Ti—O—Si linkages. Compared to Si—O linkage, the oxygen atom in a Ti—O—Si linkage resides in a more asymmetric, broadened potential well. Such broadening makes many more vibrational states accessible to the system, in effect making the system as a whole "softer". Because of the looseness of this array relative to the more rigid Si—O—Si environment, the Ti—O—Si linkages formed as a result of $TiO_2$ addition will function as high energy dissipating regions to remove energy at the stress point of the crack tip. Clustering of 5- and 6-fold coordinated Ti ions would result in even greater enhancement of fatigue resistance and extended regions of enhanced energy dissipation in the glass, as the potential wells for $^{IV}$Si—O—$^{V}$Ti and $^{IV}$Si—O—$^{VI}$Ti linkages would be even more asymmetric than for $^{IV}$Si—O—$^{IV}$Ti, and, therefore, the system would be even "softer".

At compositions above around 11 weight percent $TiO_2$, where phase separated $TiO_2$—$SiO_2$ becomes visible, the Ti—O—Si linkages within each phase domain and the Ti—O—Si linkages forming the interface between the $TiO_2$-rich inhoomogeneity and the $SiO_2$-rich matrix are very important to enhanced fatigue resistance. It appears that, for $TiO_2$—$SiO_2$ bulk glass in general at $TiO_2$ concentrations above the eutectic point, the composition of the phase separated domains or inhomogeneities is approximately the same, viz. 92–95 weight percent $TiO_2$ in at least an 11 weight percent $TiO_2$ matrix. It is conceivable that the matrix concentration could be as high as 19 weight percent $TiO_2$.

For $TiO_2$ concentrations below about 19 weight percent, the number of inhomogeneities are believed to increase with increasing overall $TiO_2$ concentration, but the size and composition remain approximately the same. Similarly, the concentration of $TiO_2$ dissolved as clustered Ti below the inhoinogeneity size threshold in the $SiO_2$-rich matrix stabilizes at a maximum near the eutectic bulk composition at 11–13 weight percent $TiO_2$.

The structure and composition of the soot as laid down, and of the glass blank after dehydration/consolidation are discussed below. In the drawn fiber, for the concentration regions studied, the proportion of inhomogeneities may increase to more than 50 volume percent. During the draw process, the large $TiO_2$ crystals in the glass blank dissolve into a $TiO_2$—$SiO_2$ melt at temperatures above about 1900° C., and subsequently precipitate out as much smaller phase separated domains or inhomogeneities in the quenched fiber as the fiber rapidly cools to below about 1550° C.

In the drawn fiber, a substantial portion of the observed inhomogeneities are between 10 and 100 Angstroms in diameter, typically approximately 30–50 Angstroms. For inhomogeneities of this scale, the composition of each phase region cannot be measured even by electron microscopy techniques. In the drawn fiber, the generally observed inhomogeneities appear to be phase separated regions without substantial crystal content.

As described above, one aspect of the present invention relates to processes for manufacturing optical fiber with $TiO_2$—$SiO_2$ outer claddings. The methods of the invention are particularly suitable for use with the outside vapor deposition (OVD) and the vapor axial deposition (VAD) soot laydown processes. OVD processes are described in U.S. Pat. No. 4.453,961 to Berkey and further described in U.S. Pat. No. 4,486,212 to Berkey, the disclosures of which are hereby incorporated by reference. VAD processes are described in *Optical Fiber Communications*, vol. 1, 1985, Bell Telephone Laboratories, Inc. section 3.3, pp. 100–1 16, and in U.S. Pat. No. 4,367,085, the disclosures of which are hereby incorporated by reference.

Typically, an additional laydown of one or more $TiO_2$—$SiO_2$ soot layers is provided at the end of a conventional OVD soot laydown process. In one embodiment, this additional laydown step is included in the process for manufacturing a single unitary soot preform with a core region and a cladding region, as described in U.S. Pat. No. 4,486,212 to Berkey. In another embodiment, the additional laydown step is provided at the end of an overcladding process such as is also described in U.S. Pat. No. 4,486,212 to Berkey, whereby a large diameter intermediate fiber comprising the core region and a portion of the cladding region is overcoated with additional cladding soot. It is known in the art that OVD and VAD soot laydown may be carried out with a plurality of burners as described in U.S. Pat. No 4,684,384 to Berkey and U.S. Pat. Nos. 4,378,985 and 4,568,370 to Powers.

The additional laydown of a $TiO_2$—$SiO_2$ layer is carried out as follows. The $SiCl_4$ vapor is provided to the burner by a reactant delivery system of the type described in U.S. Pat. No. 4,314,837 to Blankenship. In addition, the $TiCl_4$ vapor is provided to the burner by a flash vaporization system as described in U.S. Pat. No. 5,078,092 to Antos et al.

$SiO_2$ soot consists of agglomerates of glass soot particles with a diameter in the range of about 0.1 to 0.3 $\mu$m. It is believed that $TiO_2$—$SiO_2$ soot exists in three separate forms: a) agglomerates of particles of roughly homogeneous solutions of $TiO_2$ in $SiO_2$, with about the same diameter as $SiO_2$ soot particles; b) tiny crystalline fines on the surface of these particles, typically less than about 90 Angstroms in diameter (these fines being more prevalent in compositions with greater than about 10.5 weight percent $TiO_2$); and c) larger crystals agglomerated with the particles, typically between 200 and 1,000 Angstroms in diameter.

It is theorized that the $TiCl_4$ and $SiCl_4$ react at approximately the same temperature in the flame, forming the roughly homogeneous glass particles, except where the $TiCl_4$ can react with $H_2O$ at temperatures less than approximately 1600° C. As the solubility limit of $TiO_2$ in $SiO_2$ is exceeded, the fines of $TiO_2$ may be precipitated from the molten particles. The larger crystals may be formed by the reaction of $TiCl_4$ with $H_2O$ at temperatures less than about 1600° C. in the cooler centerline of the burner flame.

After laydown, the soot preforms can be dehydrated and consolidated, typically in an atmosphere containing a drying agent such as chlorine, as described in U.S. Pat. No. 3,933,454 to DeLuca, U.S. Pat. No. 4,125,388 to Powers, and U.S. Pat. No. 4,741,748 to Lane et al., the disclosures of which are hereby incorporated by reference. The dehydration and consolidation steps can be carried out simultaneously or in two different steps, provided that rewetting of the dehydrated preform is avoided by the use of a dry inert gas atmosphere or other means. In an alternative embodiment, the deposition of the $TiO_2$—$SiO_2$ outer cladding layer can be carried out after the dehydration/consolidation of the rest of the preform, and the resultant preform with a soot outer cladding layer can be thereafter dehydrated and consolidated.

$TiO_2$ can exist in two crystalline forms, anatase and rutile. Anatase is the low temperature form, and rutile is the higher density, high temperature polymorph. The transformation from anatase to rutile is irreversible and with a reagent grade powder proceeds to completion at a temperature below 1000° C. as reported in Rao, *Can. J. Chem.* 29:498–500 (1961), which is hereby incorporated by reference.

Without the inclusion of an additional metal oxide such as tin oxide in the outer metal cladding layer, the principal form of crystalline titania in the porous outer cladding layer of the preform is anatase. However, the introduction of such metal oxides modifies the crystalline form of titania crystals during laydown. As a result, when tin is present in the porous outer cladding layer, the principal form of crystalline titania is rutile.

Consolidation of an optical waveguide glass blank having an $SiO_2$—$TiO_2$ outer cladding layer with a $TiO_2$ concentration in the range of 8–16 weight percent, is generally carried out above 1400° C., a temperature at which one could reasonably assume that the crystalline $TiO_2$ in the cladding layer is completely converted from anatase to rutile. This, however, has been found not to be the case, complete conversion of anatase to rutile $TiO_2$ in an $SiO_2$—$TiO_2$ cladding layer requires temperatures above 1500° C. Thus, the presence of $SiO_2$ appears to have an inhibiting effect on the anatase-rutile transformation. Although applicants do not wish to be bound by theoretical considerations, they believe that this inhibiting effect is caused by the formation of a solid solution in which Si atoms are interstitially incorporated into the $TiO_2$ anatase lattice.

Applicants have now unexpectedly found that the inhibitory effect of $SiO_2$ on the $TiO_2$ anatase-rutile transformation can be substantially ameliorated by the inclusion of certain metal oxide precursors in the reactant stream used to format the porous outer layer of a preform for a glass blank. For example, if $SnO_2$ is deposited along with $SiO_2$ and $TiO_2$ in this porous layer, the rate of anatase-to-rutile $TiO_2$ conversion is enhanced by an order of magnitude. In addition to compounds of Sn, other compounds useful for promoting anatase-rutile conversion in the course of glass blank consolidation include precursors of the oxides of Pb, Bi, Sb, and mixtures thereof.

In addition to its promoting effect on anatase-rutile $TiO_2$ conversion, the inclusion of a $SnO_2$ precursor in the outer layer reactant stream has an additional, perhaps related, benefit. Consolidation of the preform to the glass blank in the presence of $SnO_2$ results in the loss of substantially less $TiO_2$ from the $SiO_2$—$TiO_2$ outer cladding layer than if $SnO_2$ were not present. Thus, during consolidation at temperatures at about 1100° C. and above, the $SnO_2$ present is sacrificially lost in preference to $TiO_2$. In fact, following consolidation, substantially no $SnO_2$ remains in the glass blank. While not wishing to be bound by theory, it is believed that the large size of anatase crystals enhances their reactivity with chlorine, producing volatile titanium compounds that are carried away in the exhaust gases. By contrast, rutile crystals have smaller surface areas, which makes them less susceptible to reaction with chlorine.

Still a further unexpected advantage has been found stemming from the use of an $SnO_2$ precursor in the fabrication of glass blanks in accordance with the present invention. Included in the consolidation process is a driving phase that reduces the OH content of the preform. Drying is typically achieved by the inclusion of a drying gas, preferably chlorine, in the consolidation gas atmosphere, which typically also contains helium. However, applicants have discovered that $SnO_2$ acts as a drying agent, allowing consolidation of a preform to a blank in an atmosphere containing only helium.

As noted above, the predominant crystalline form of titania in the consolidated glass blank of the present invention is rutile. During fiber drawing, all crystalline forms of titania are converted to an amorphous state. However the resulting optical fibers produced in accordance with the present invention show unexpectedly improved fatigue resistance.

The following examples further illustrate the invention.

EXAMPLES

Example 1

Effect of Tin Oxide On Anatase-Rutile Conversion Of $TiO_2$

To quantify the effect of $SnO_2$ on the anatase-rutile conversion of $TiO_2$, a series of soot preforms were prepared from a reaction stream containing $SiCl_4$ and $TiCl_4$. The resulting preforms contained a total concentration of about 5 to 18 weight percent $TiO_2$. A second series of soot preforms was prepared, similar to the first except that sufficient $SnCl_4$ was included in the reaction stream to yield two weight percent $SnO_2$ in each of the preforms. The concentration of the rutile form as a fi-action of the total crystalline $TiO_2$ in the preforms was determined by X-ray diffraction.

Figure 1:
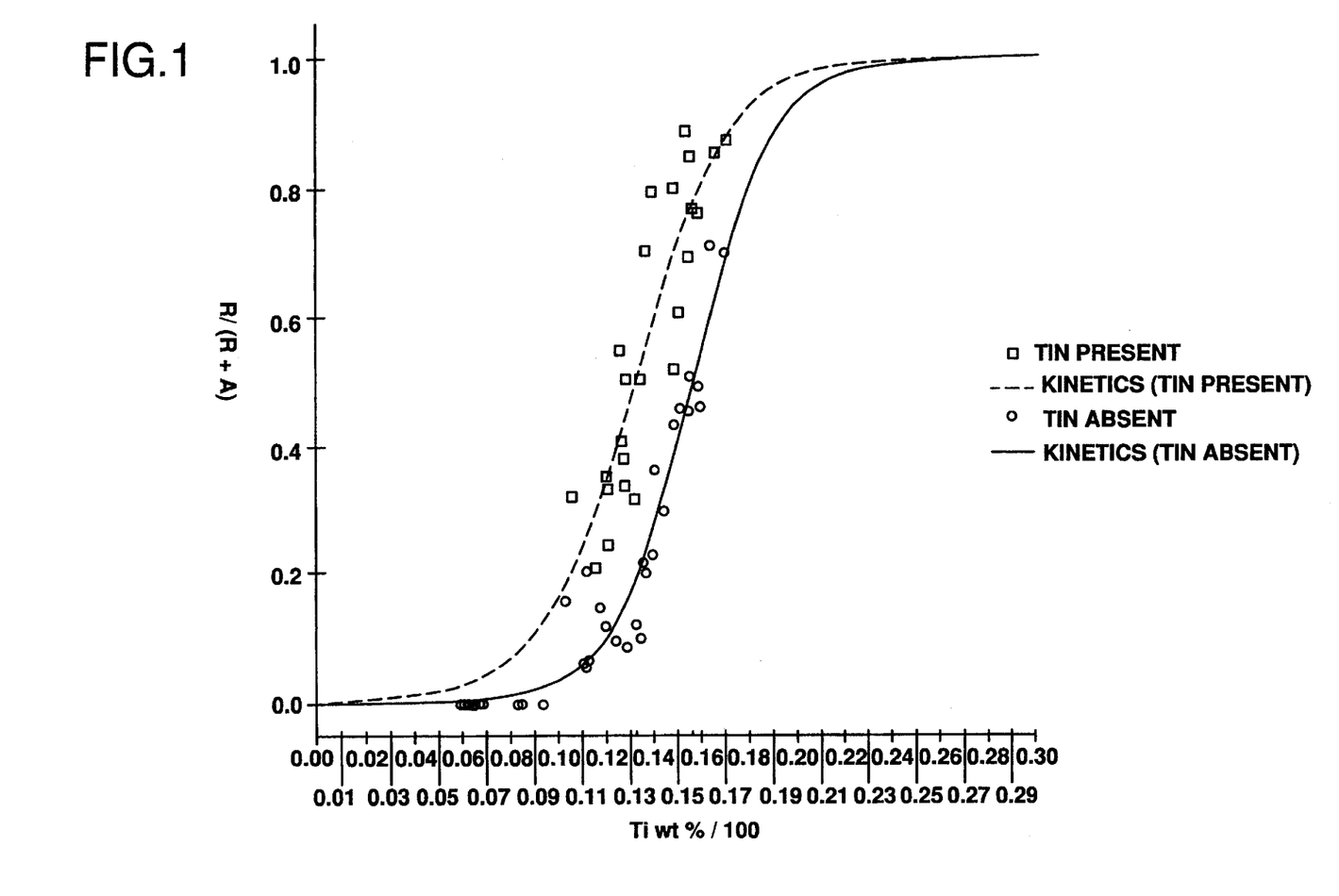
FIG. 1 graphically represents the fraction of rutile crystalline $TiO_2$ in the outer cladding layer of a preform versus the total concentration of deposited $TiO_2$ when $SnO_2$ is present or absent in the preform.

FIG. 1 graphically displays the results of this work. The weight fraction of rutile as a function of total $TiO_2$ content was a sigmoidal relationship. The rutile fraction for low and high $TiO_2$ concentrations asymptotically approached zero and one, respectively. A possible mechanism for the transformation of anatase to rutile can be described as a two step process. The first step involves the direct transformation of anatase (A) to rutile (R) at a rate described by the constant $K_1$.

(1)

In Equation (1), it is assumed that the reaction depends only on the original concentration of titania, which, will be represented by $[A_o]$. The concentration of anatase and rutile as a function of time will be represented by $[A]$ and $[A_o]-[A]$, respectively Equation (1) simply means that the larger the initial concentration of anatase the more likely rutile can be formed. Thermodynamically, rutile is more stable than anatase, the direction of the reaction is always to the right.

The second process step is transformation of anatase to rutile represented by Equation (2).
To obtain $$A + R \xrightarrow{K_2} 2R$$  (2)

the kinetics solution, the rate equation for the reactions of anatase must be defined. Afterwards, this equation is integrated. and the rate constants are determined by fitting the fractional rutile concentration to the integrated rate equation solution.

The rate equation for anatase is given by:

$$-\frac{d[A]}{dt} = K_1[A] + K_2[A][R] = K_1[A] + K_2[A]\{[A_o] - [A]\}$$  (3)

This equation can be integrated by rearranging Equation (3) into the form given by:

$$-\int_{[A_o]}^{[A]} \frac{[dA]}{K_1[A] + K_2\{[A_o] - [A]\}[A]} = (t - t_o)$$  (4)

where t and $t_o$ are the final and initial times of the reaction. The solution to Equation (4) is given by the following equation.

$$-\log_e\left(\frac{K_1[A]}{K_2\{[A_o] - [A]\}[A_o] + K_1[A]}\right) = (t - t_o)(K_1 + K_2[A_o])$$  (5)

If one rearranges equation (5) and solves for $[A]$, one finds that $$[A] = \frac{(K_1[A_o] + K_2[A_o]^2)e^{-t(K_1+K_2[A_o])}}{(K_1 + K_2[A_o])e^{-t(K_1+K_2[A_o])}},$$  (6)

where the initial time $t_o$ is assumed to be zero. To solve the concentration of futile $[R]$, the identity that $[R]$ equals $\{[A_o]-[A]\}$ and the fractional rutile concentration are used to obtain the fraction given by the rutile concentration divided by the sum of the anatase and rutile concentrations. This ratio is given in Equation (7)

$$\frac{[R]}{[R] + [A]} = \frac{K_1(1 - e^{-tG})}{(K_1 + K_2[A_o]e^{-tG})},$$  (7)

where G is given by $(K_1+K_2[A_o])$. The time for the runs was three hours. This is equivalent to 10,800 seconds. This time period will be the fixed time in Equation (7). When the weight fraction $[A_o]$ equals zero and 1, the fractional concentration of rutile asymptotically approaches zero and 1, respectively. Therefore, Equation (7) correctly describes the apparent form of the data.

Fitting the data obtained to Equation (7), the following rate constants $K_1$ and $K_2$ in the absence and presence of $SnO_2$ were determined:

| $SnO_2$ | $K_1$ (Sec$^{-1}$) | $K_2$ (Sec$^{-1}$) |
|---|---|---|
| Absent | $2.38 \times 10^{-7}$ | $5.6 \times 10^{-3}$ |
| Present | $2.01 \times 10^{-8}$ | $6.3 \times 10^{-3}$ |

Thus, the limiting step in the reaction kinetics is that shown in Equation (1), which is controlled by the $K_1$ rate constant. The presence of tin helps transforming anatase to rutile by a rate constant an order of magnitude larger than when tin is absent. The $K_2$ rate constants for tin present or absent are almost identical, which shows that tin has little effect in changing the reaction kinetics as described by Equation (2).

Example 2
Variations in Dopant and Burner Gas Flows in Fabricating Soot Preforms The following describes the equipment and conditions under which soot preforms were fabricated to produce the data displayed in FIG. 1. Two series of preforms were prepared. Members of the first series had various levels of $TiO_2$, and each member of the second series contained two weight percent $SnO_2$ in addition to $TiO_2$. A series of dopant and burner gas flows were used to simulate a range of temperatures that might be encountered in the deposition of titania-doped silica coatings on optical wave guide (OWG) fiber blanks.

The delivery system consisted of three heated bubblers containing the reactants $SiCl_4$ at 43° C., $TiCl_4$ at 84° C., and $SnCl_4$ at 55° C. Oxygen was bubbled through the liquids via Tylan Mass Flow controllers controlled by an IBM-PC/XT. Flow settings for the dopants were held constant at 1.5 l/min, 1.45 l/min, and 0.15 l/min for $SiCl_4$, $TiCl_4$, and $SnCl_4$, respectively. The highly focused burner gas flows were also controlled by the computer and were linearly increased during deposition in three ranges: 6–11 l/min, 7–12 l/min, and 8–13 l/min. The premix oxygen to methane gas ratios of 0.7, 0.8, 0.9, and 0.97 were varied for each of the three ramp conditions. This represented three temperature ranges and four flame oxidation conditions. Lower burner gas flow rates and higher premix ratios (higher oxidizing conditions) appeared to improve the $TiO_2$ deposition rate. The inner shield, outer shields, and extra oxygen gas flows were held constant at 2.5, 3.6, and 1.0 l/min, respectively. Ramping of the premix gases was employed to achieve a suitable density that would prevent the preforms from splitting.

Preform fabrication consisted of the deposition of titania doped or tin-titania doped silica by flame hydrolysis on a ½"

tapered alumina bait rod with a 0.002 inch/inch taper. This allowed easier bait removal after the preform had cooled. The alumina bait rods were initially preheated for 20 min, which cleaned and fire polished them and removed any foreign material that might have been present. Gas flows for this part of the process were nominally 10 l/min and 9.7 l/min for methane and oxygen, respectively. A carbon deposit was then applied to the bait rod using an acetylene torch, which was accomplished by holding the acetylene torch stationary under the bait as it traversed for 6 to 10 cycles of the 20" deposition distance while traveling at 2.5 cm/sec and rotating at 200 rpm. Both rotation and traversing, speed and direction were controlled by Compumotor 2100 controllers in a stand alone mode.

Prior to the start of the deposition phase of the process, oxygen was bubbled through the dopants at the prescribed flows for 20 to 30 minutes to allow the temperature to stabilize. An additional 5 minutes of mixing through the burner was also allowed before the traverse was started. Depositions lasted 3 hours. The preforms were then removed from the bait and placed in a holding oven at 125° C. with a nitrogen purge until consolidated.

The soot preforms were consolidated for 3 hours and 20 minutes in a helium atmosphere (40 l/min.) at a furnace set point of 1510° C. Down feed through the hot zone was maintained at 5.0 mm/min. The concentration of $TiO_2$ and the crystalline phases of $TiO_2$ in the soot preforms were measured by wet chemical and x-ray analysis, respectively.

FIG. 1 displays the amount of rutile (R) $TiO_2$ as a fraction of rutile (R) plus anatase (A) crystalline $TiO_2$ (R/(R+A)) present in the preforms versus the total weight percentage of deposited $TiO_2$ when $SnO_2$ is present or absent in the preforms. For a given total concentration of $TiO_2$ in the deposited soot, the presence of $SnO_2$ results in the formation of substantially increased amounts of rutile crystalline $TiO_2$ in the $SiO_2$—$TiO_2$ outer cladding layer. The promoting effect of $SnO_2$ on the transformation of anatase to rutile crystalline $TiO_2$ in the presence of $SiO_2$ was the conclusion of the kinetics measurements discussed above.

Example 3
Fabrication of Preforms Using $TiO_2$ and $SnO_2$ Precursors at Various Concentrations Preforms were fabricated using a silica core glass deposited prior to the deposition of the titania-tin layers, thus simulating the overcladding procedure normally found in the standard OWG process. This process utilized a ¼" O.D. tapered alumina bait, rotating at 200 rpm, on which a deposition of $SiO_2$ soot measuring 30 mm in diameter and 50 cm in length was formed over a period of 2.5 hours. The bait traverse speed was 2.54 cm/sec, The $SiO_2$ source material was $SiCl_4$ heated to 43° C. Oxygen was bubbled through the $SiCl_4$ liquid at various rates to generate a constant mass of 7.26 gpm (grams/minute).

The dopants were routed to a manifold forming the final vapor stream, which was fed to a highly focused burner with a fume tube diameter of 0.089 in. Delivery line temperatures were maintained at 125° C. to prevent condensation of the dopants in the delivery lines. After the initial completion of a 2.5 hour deposition of $SiO_2$, the combination of $SnCl_4$ and $TiCl_4$ vapors were simultaneously routed into the delivery line with the $SiCl_4$ vapor. No attempt was made to move the burner off the preform prior to the introduction of the tin and titania to allow for equilibration. The $SnCl_4$ liquid was heated to 55° C., and oxygen was passed through the liquid at a flow rate of from 0.148 to 0.741 lpm (liters/minute). The $TiCl_4$ was heated to 83° C., and an oxygen gas flow was fed through it at a constant flow rate of 1.224 lpm. The $SiCl_4$ oxygen flow was decreased from its starting flow of 1.886 lpm at the end of the $SiO_2$ overclad period to as low as 1.414 lpm, which corresponded to 10% $SnO_2$, 15% $TiO_2$, and 75% $SiO_2$ in the flame. The dopant oxygen gas flows were controlled by Tylan Mass Flow Controllers, which themselves were controlled by an IBM/PC XT computer. The highly focused burner gas flows were also controlled via the computer and mass flow controllers. The premix gas and oxygen were programmed to increase at one second intervals, linearly starting out at 6 lpm $CH_4$ and ending at 11 lpm over the deposition period. The premix oxygen increased at an equivalent rate, maintaining an oxygen to gas ratio of 0.97 to the $CH_4$ flow; this corresponds to an overall increase of from 5.82 to 10.67 lpm for the premix oxygen. The burner inner-shield, outer-shield and fume tube oxygen were held constant at 2.5, 3.6 and 1.0 lpm, respectively.

TABLE 1

| Weight Percentage (Flow Rate, lpm) | | |
|---|---|---|
| $SiCl_4$ | $TiCl_4$ | $SnCl_4$ |
| 100 (1.886) | 0 | 0 |
| 85 (1.603) | 15 (1.224) | 0 |
| 75 (1.414) | 15 (1.224) | 10 (0.741) |
| 77 (1.452) | 15 (1.224) | 8 (0.593) |
| 79 (1.490) | 15 (1.224) | 6 (0.444) |
| 81 (1.527) | 15 (1.224) | 4 (0.296) |
| 83 (1.565) | 15 (1.224) | 2 (0.148) |

Example 4
Consolidation of Preforms with and without Chlorine in Consolidation Atmosphere Following the procedure described in Example 3, two samples of preforms were prepared from each of a series of compositions containing 15 weight percent $TiO_2$ and 2–10 weight percent $SnO_2$. One sample was consolidated in a helium (40 lpm) muffle atmosphere while the other was consolidated in a muffle atmosphere containing 40 lpm helium and 0.4 lpm $Cl_2$. Both consolidations were carried out at 1510° C., as monitored outside the quartz muffle; the actual preform temperature under these conditions was about 1425° C. Under either set of atmospheric conditions, the preforms were held in the upper zone of the consolidation furnace for 40 minutes prior to being lowered into the hot zone at 5 mm/min. At the end of the down-feed cycle, another 10 minute hold was initiated before the consolidated blank was withdrawn from the furnace at 35 mm/min and cooled to room temperature.

Figure 2:
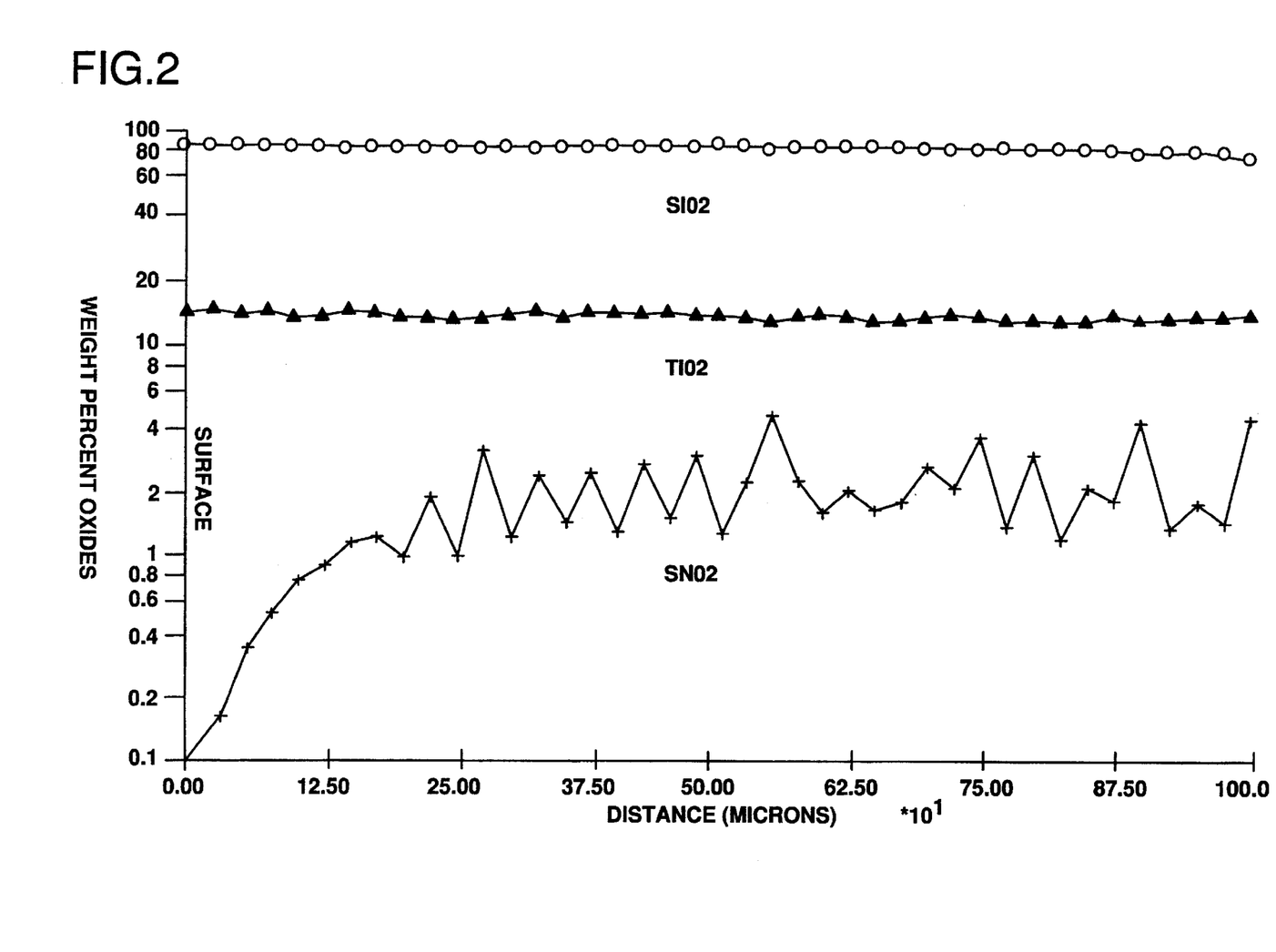
FIGS. 2 and 3 are graphs of the concentrations of oxides present in the outer cladding layers of glass blanks as a function of distance from the surface for blanks consolidated in, respectively, the absence and presence of chlorine.
Figure 3:
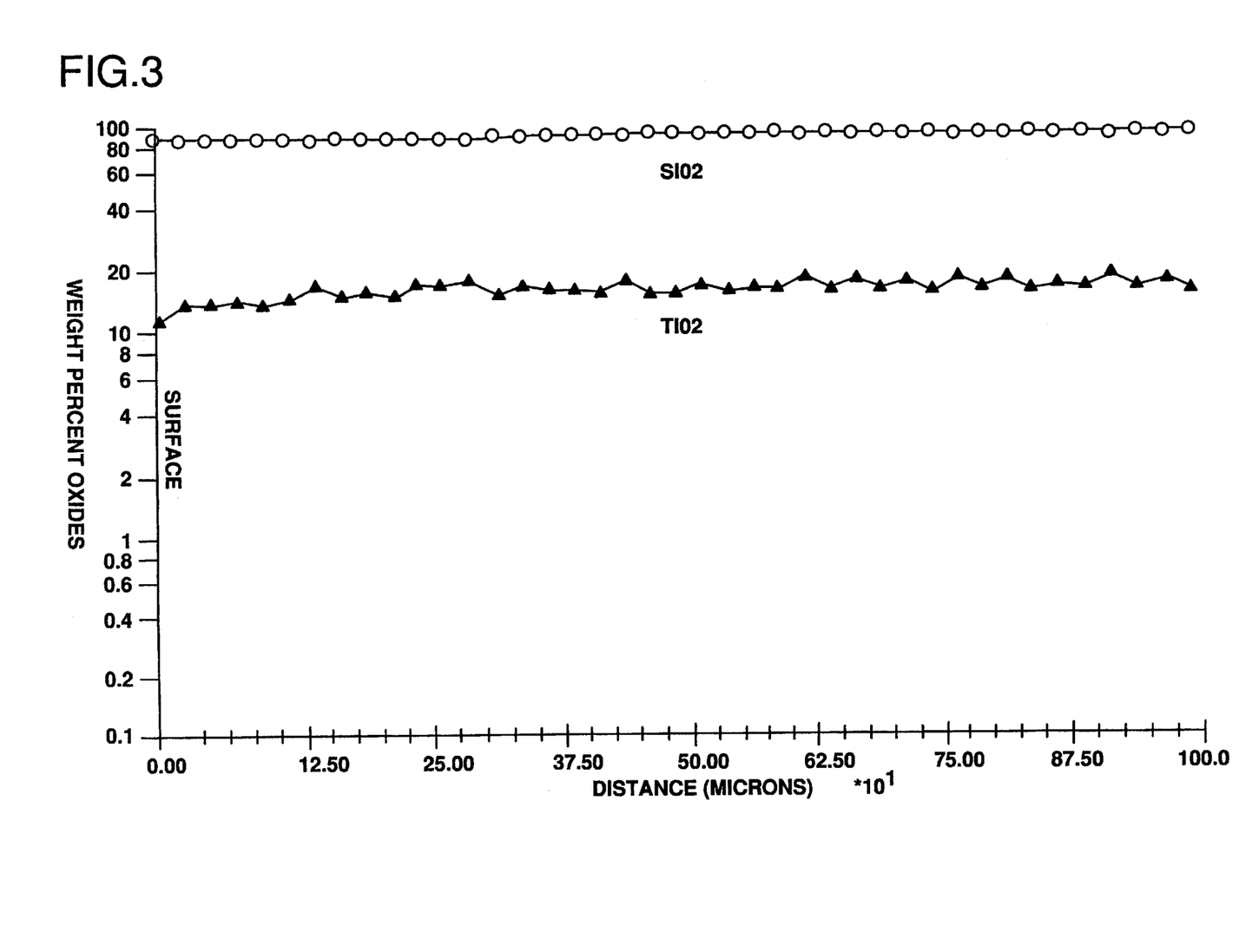

FIGS. 2 and 3 graphically present microprobe analytical data obtained from preforms containing 15 weight percent $TiO_2$ and 6 weight percent $SnO_2$ that had been consolidated in, respectively, the absence and presence of chlorine.

FIG. 2, which plots the weight percentages of the oxides as a function of distance from the surface for the blank consolidated in the no-chlorine atmosphere, shows that, on average, about 2 weight percent $SnO_2$ remained in the consolidated blank.

FIG. 3, which displays the oxide contents of the blank that had been consolidated with chlorine present, shows no detectable amount (<0.1 weight percent) of $SnO_2$ remaining in the blank. Apparently, the chlorine in the consolidation atmosphere accelerated the depletion of $SnO_2$ from the blank.

For the lower starting concentrations (2–4 weight percent) of $SnO_2$ in the preforms, $SnO_2$ removal from the blank was substantially complete in both the chlorine-absent and chlorine-present consolidation atmospheres.

Example 5
Effect of $SnO_2$ on Depletion of $TiO_2$ from the Outer Cladding Layer of a Blank.

A series of preforms prepared as described in Example 3 and containing about 11 weight percent $TiO_2$ and 2–8 weight percent $SnO_2$ were consolidated in 1 percent chlorine in helium atmosphere, as described in Example 4. A loss of 1–2 weight percent $TiO_2$ in the outer cladding layer of the blank from the amounts originally present in the preforms resulted from the consolidation process. Under the same conditions, there was a 4–8 weight percent depletion in $TiO_2$ in the outer cladding layer when no $SnO_2$ was present in the preform.

Because $SnO_2$ acts as a drying agent, consolidation of $SnO_2$ containing preforms to glass blanks can be accomplished in a chlorine-free atmosphere. Chlorine can attack $TiO_2$ to produce volatile migrating species so consolidation in an inert atmosphere such as helium in the absence of chlorine may be advantageous.

Example 6
Fatigue Resistance of Fiber Obtained from $SnO_2$— Containing Augmented Preform A fiber was drawn from a blank obtained by consolidation of a preform having an outer layer produced by a 30-minute deposition of soot containing 10 weight percent $TiO_2$ and 2 weight percent $SnO_2$. Tensile strength measurements made on short gauge lengths of fiber showed fatigue resistance "n" values of 32–35 (this parameter is discussed in Backer et al., '975 and in Glaesemann et al., "Strength Variability of Indented Soda-Lime Glass," *J. American Ceramic Society*, 70:441–44 (1987). Using 10-m lengths of fibers, "n" values between 47 and 60, with a mean of 53, were obtained.

The invention has been described in detail for the purpose of illustration, but it is understood that such detail is solely for that purpose, and variations can be made therein by those skilled in the art without departing from the spirit and scope of the invention, which is defined by the following claims.

What is claimed:

1. A process of forming a preform comprising a core portion and a cladding portion surrounding the core portion, said cladding portion having an outer layer and said preform being suitable for consolidation to a glass blank for producing an optical waveguide fiber, said process comprising:
   oxidizing a precurser of an additive compound, and Si and Ti containing compounds to form the additive compound, and $SiO_2$ and $TiO_2$, and,
   forming said preform containing the additive compound, the $SiO_2$, and the $TiO_2$, at least in the outer cladding layer of said cladding portion wherein a portion of the $TiO_2$ present in said preform is in crystalline form with the crystalline form being predominantly rutile.

2. The process according to claim 1 further comprising:
   consolidating said preform, after carrying out said oxidizing and said forming, under conditions effective to form said preform into a glass blank.

3. The process according to claim 2, wherein said consolidating is carried out under an atmosphere of a treating gas, wherein said treating gas is selected from the group consisting of helium, oxygen, and chlorine.

4. The process according to claim 3, wherein by the process comprising:
   the additive compound is preferentially sacrificed instead of $TiO_2$, when consolidating said preform.

5. The process according to claim 1 wherein the additive compound causes more of the crystalline $TiO_2$ present in the preform to be rutile in comparison to the amount of rutile present in a similar preform made using a process which does not include the additive compound.

6. A process for reducing depletion of $TiO_2$ from an $SiO_2$—$TiO_2$ containing glass blank during formation of said glass blank from a preform having a porous outer layer, which during said formation becomes the outer layer of the glass blank, comprising:
   oxidizing Si and Ti containing compounds and a precurser of an additive compound to form $SiO_2$—$TiO_2$, and the additive compound;
   forming a preform containing, at least in the outer porous layer, the $SiO_2$, the $TiO_2$, and the additive compound; and
   consolidating the preform under conditions effective to form a glass blank, wherein said additive compound is effective to reduce depletion of $TiO_2$ in at least the outer layer of said glass blank during said consolidation.

7. The process according to claim 1, 4, or 6, wherein the additive compound is a metal oxide compound, said metal being selected from the group consisting of Sn, Pb, Bi, Sb, and mixtures thereof.

8. The process according to claim 6 wherein said step of forming a preform is carried out by an outside vapor deposition process or a vapor axial deposition process.

9. The process according to claim 6, wherein said additive compound is $SnO_2$ comprising about 0.1 to 10 weight percent of said porous outer cladding layer.

10. The process according to claim 6, wherein the outer cladding layer of said class blank has a $TiO_2$ concentration no more than about 3 weight percent less than the $TiO_2$ concentration of said porous outer cladding layer of said preform.

11. The process according to claim 6, wherein said porous outer cladding layer of said preform comprises about 8 to 20 weight percent $TiO_2$, and said outer cladding layer of said glass blank comprises about 5 to 17 weight percent $TiO_2$.

12. The process according to claim 4 or 6 wherein said consolidating is carried out at a temperature of 900° to 1400° C.

13. The process according to claim 6, wherein said additive compound is $SnO_2$ comprising about 1 to 2 weight percent of said porous outer cladding layer.

14. The process according to claim 6, wherein said porous outer cladding layer of said preform comprises about 11 to 13 weight percent $TiO_2$, and said outer cladding layer of said glass blank comprises about 8 to 10 weight percent $TiO_2$.

* * * * *

UNITED STATES PATENT AND TRADEMARK OFFICE
CERTIFICATE OF CORRECTION

PATENT NO. : 6,189,340 B1
DATED : February 20, 2001
INVENTOR(S) : Gerald Eugene Burke, Carlton Maurice Truesdale It is certified that error appears in the above-identified patent and that said Letters Patent is hereby corrected as shown below:

<u>Column 14,</u>
Line 3, "by the process comprising:" should be deleted. Should be "The process according to claim 3, wherein the additive compound ..."
Line 38, "class blank" should be -- glass blank --

Signed and Sealed this

Twenty-fifth Day of December, 2001

Attest:

JAMES E. ROGAN
*Attesting Officer*   *Director of the United States Patent and Trademark Office*